(12) United States Patent
Buckley et al.

(10) Patent No.: US 11,698,092 B2
(45) Date of Patent: Jul. 11, 2023

(54) TELESCOPIC POLE FOR A CLEANING IMPLEMENT

(71) Applicant: Unger Marketing International, LLC, Bridgeport, CT (US)

(72) Inventors: James M. Buckley, New Hartford, CT (US); Stephen P. Huda, Shelton, CT (US); Brandon M. Temple, Stamford, CT (US)

(73) Assignee: Unger Marketing International, Bridgeport, CT (US)

( * ) Notice: Subject to any disclaimer, the term of this patent is extended or adjusted under 35 U.S.C. 154(b) by 51 days.

(21) Appl. No.: 17/343,134

(22) Filed: Jun. 9, 2021

(65) Prior Publication Data

US 2021/0396257 A1 Dec. 23, 2021

Related U.S. Application Data

(60) Provisional application No. 63/042,254, filed on Jun. 22, 2020.

(51) Int. Cl.
*F16B 7/14* (2006.01)
*B25G 1/04* (2006.01)

(52) U.S. Cl.
CPC .......... *F16B 7/1454* (2013.01); *F16B 7/1427* (2013.01); *B25G 1/04* (2013.01)

(58) Field of Classification Search
CPC ........ B25G 1/04; F16B 7/1418; F16B 7/1454; F16B 2/185; Y10T 403/32467; Y10T 403/595; Y10T 16/4719; Y10T 16/473
See application file for complete search history.

(56) References Cited

U.S. PATENT DOCUMENTS

| | | |
|---|---|---|
| 3,751,748 A | 8/1973 | Roe et al. |
| 4,154,545 A | 5/1979 | Pinto et al. |
| 4,524,484 A | 6/1985 | Graham |

(Continued)

FOREIGN PATENT DOCUMENTS

| | | | | |
|---|---|---|---|---|
| DE | 20 2019 101 821 | * | 5/2019 | ................ F16B 7/14 |
| EP | 1338753 A1 | | 8/2003 | |

(Continued)

OTHER PUBLICATIONS

European Search Report for European Application No. 21179823.6, dated Jan. 26, 2022, 11 pages.

*Primary Examiner* — Michael P Ferguson
(74) *Attorney, Agent, or Firm* — McCarter & English, LLP; Dave S. Christensen

(57) ABSTRACT

Telescoping pole systems and clamps thereof are described. The clamps include a body having one or more pin extensions and one or more locking extensions. The pin extensions and the locking extensions are arranged in an alternating manner. A pivot handle is operably connected to the body and has a lever arm that extends from an offset hinge, the offset hinge defining a hinge axis. A pivot pin passes through the one or more pin extensions of the body and the offset hinge of the pivot handle. The pivot pin defines a pivot axis. The hinge axis and the pivot axis are parallel but offset from each other and the one or more locking extensions are arranged to be actuated by the offset hinge as the pivot handle is rotated about the pivot axis of the pivot pin. The poles of such systems may be multi-lobed.

24 Claims, 9 Drawing Sheets

(56) References Cited

U.S. PATENT DOCUMENTS

| | | |
|---|---|---|
| 4,768,258 A | 9/1988 | Langenstein |
| 4,932,622 A * | 6/1990 | Hayakawa ............ F16M 11/32 |
| | | 248/188.5 |
| 5,033,155 A | 7/1991 | Klotz |
| 5,271,682 A | 12/1993 | Realdon |
| 5,288,161 A | 2/1994 | Graves et al. |
| 5,598,598 A | 2/1997 | Sorenson |
| 5,682,641 A | 11/1997 | Newman, Jr. et al. |
| 5,713,617 A | 2/1998 | Marinaro |
| 5,791,805 A | 8/1998 | Lynch et al. |
| 5,839,145 A | 11/1998 | Petner |
| 5,940,933 A | 8/1999 | Chang |
| 6,546,596 B2 | 4/2003 | Grote et al. |
| 6,721,988 B2 | 4/2004 | Woodruff |
| 6,908,249 B2 | 6/2005 | Tomm |
| 7,001,095 B1 | 2/2006 | Chen |
| 7,096,530 B2 | 8/2006 | Goulet |
| 7,302,745 B2 | 12/2007 | Stahle |
| 7,721,391 B2 | 5/2010 | Bukovitz et al. |
| 7,959,191 B2 | 6/2011 | Schouten |
| 8,006,711 B2 | 8/2011 | Pietrzak et al. |
| 8,029,035 B1 | 10/2011 | Bottner |
| 8,042,848 B2 | 10/2011 | Tu |
| 8,100,446 B1 | 1/2012 | Moore et al. |
| 8,132,289 B2 | 3/2012 | Hahn |
| 8,321,988 B1 | 12/2012 | Randall |
| 8,336,835 B1 | 12/2012 | Benner et al. |
| 8,376,646 B2 | 2/2013 | Melino, Sr. et al. |
| 8,522,387 B2 | 9/2013 | Chen |
| 8,702,339 B2 * | 4/2014 | Ballentine ............ F16B 7/1454 |
| | | 403/109.5 |
| 8,746,267 B2 * | 6/2014 | Lovley, II ............ F16B 7/1454 |
| | | 135/120.2 |
| 8,851,784 B2 | 10/2014 | Donohue |
| 8,978,194 B1 | 3/2015 | Lentine |
| 9,204,774 B1 | 12/2015 | Jackson |
| 9,241,560 B1 | 1/2016 | Angel |
| 9,247,856 B2 | 2/2016 | Colangelo |
| D785,441 S | 5/2017 | Katsuma |
| 9,651,073 B2 * | 5/2017 | Bukovitz ............ F16B 7/1454 |
| 9,901,950 B1 | 2/2018 | Thompson |
| 9,933,001 B2 | 4/2018 | Gardiner |
| 10,188,199 B2 | 1/2019 | Hilliard |
| 11,084,161 B2 * | 8/2021 | Everingham ............ B25G 1/04 |
| 11,118,709 B2 * | 9/2021 | Hsu ........................ F16L 37/20 |
| 2003/0011204 A1 | 1/2003 | Grizzle |
| 2003/0135950 A1 | 7/2003 | Dove |
| 2003/0174503 A1 * | 9/2003 | Yueh ........................ F21V 21/22 |
| | | 362/249.07 |
| 2004/0078925 A1 * | 4/2004 | Evans ................ F16L 27/1273 |
| | | 15/414 |
| 2004/0101351 A1 | 5/2004 | Pitcher |
| 2006/0147256 A1 | 7/2006 | Richardson et al. |
| 2006/0218752 A1 | 10/2006 | Potempa |
| 2006/0230581 A1 | 10/2006 | Richardson et al. |
| 2007/0131070 A1 | 6/2007 | Hull et al. |
| 2007/0163065 A1 | 7/2007 | Chang |
| 2008/0072391 A1 | 3/2008 | Jones |
| 2009/0094791 A1 | 4/2009 | Blom |
| 2012/0246855 A1 | 10/2012 | Zeinert |
| 2014/0130306 A1 | 5/2014 | Andel |
| 2014/0182074 A1 | 7/2014 | Mark |
| 2016/0186791 A1 * | 6/2016 | Lee ........................ F16B 7/1454 |
| | | 248/188.5 |
| 2016/0206171 A1 | 7/2016 | Metzel et al. |
| 2016/0288310 A1 | 10/2016 | Larouche |
| 2018/0009099 A1 | 1/2018 | Resh |
| 2018/0258968 A1 | 9/2018 | Mawlam |

FOREIGN PATENT DOCUMENTS

| | | |
|---|---|---|
| EP | 1825965 A1 | 8/2007 |
| EP | 1627153 B1 | 3/2008 |
| EP | 2383077 A2 | 11/2011 |
| EP | 2674629 A2 | 12/2013 |
| EP | 2687733 A1 | 1/2014 |
| EP | 2799189 A1 | 11/2014 |
| GB | 2220163 A | 1/1990 |
| WO | 2018051141 A1 | 3/2018 |
| WO | WO 2018/157209 * 9/2018 | ............ B25G 1/04 |

* cited by examiner

TELESCOPIC POLE FOR A CLEANING IMPLEMENT

CROSS REFERENCE TO RELATED APPLICATIONS

This application claims the benefit of U.S. Provisional Application Ser. No. 63/042,254, filed Jun. 22, 2020, the entire disclosure of which is incorporated herein by reference.

BACKGROUND

The subject matter disclosed herein relates to handles or poles for use with cleaning implements, such as window squeegees, dusters, ceiling fan dusters brooms, wash brushes, sponges, and other high-access cleaning implements. In particular the subject of the present disclosure is to telescopic poles that facilitate the use of the cleaning implements.

When cleaning, it may be difficult to reach certain locations, such as corners, ceilings, under furniture, etc. As such, poles or handles for cleaning implements may be telescopic to enable adjusting a reach of the cleaning implements. While existing poles are suitable for their intended purposes the need for improvement remains, particularly in providing an ergonomic shape pole having the features described herein.

BRIEF DESCRIPTION

According to some embodiments, clamps for telescoping poles are provided. The clamps include a body having one or more pin extensions and one or more locking extensions, wherein the pin extensions and the locking extensions are arranged in an alternating manner, a pivot handle operably connected to the body, the pivot handle having a lever arm that extends from an offset hinge, the offset hinge defining a hinge axis, and a pivot pin passing through the one or more pin extensions of the body and the offset hinge of the pivot handle, the pivot pin defining a pivot axis. The hinge axis and the pivot axis are parallel but offset from each other, and the one or more locking extensions are arranged to be actuated by the offset hinge as the pivot handle is rotated about the pivot axis of the pivot pin.

In addition to one or more of the features described above, or as an alternative, further embodiments of the clamps may include a locking protrusion formed at an end of each locking extension.

In addition to one or more of the features described above, or as an alternative, further embodiments of the clamps may include that the body has a multi-lobe geometry.

In addition to one or more of the features described above, or as an alternative, further embodiments of the clamps may include at least one positioning protrusion formed on an interior surface of body.

In addition to one or more of the features described above, or as an alternative, further embodiments of the clamps may include that the offset hinge defines a gradually increasing radius of material thickness in a rotation from an open state to a closed state.

In addition to one or more of the features described above, or as an alternative, further embodiments of the clamps may include that the body has a first diameter opening at a first end and a second diameter opening at a second end, wherein the first diameter opening is smaller than the second diameter opening.

In addition to one or more of the features described above, or as an alternative, further embodiments of the clamps may include that the first diameter opening is defined by one or more stop structures.

In addition to one or more of the features described above, or as an alternative, further embodiments of the clamps may include that the body defines a through-aperture from the first diameter opening to the second diameter opening.

According to some embodiments, telescoping pole systems are provided. The telescoping pole systems include a first pole, a second pole having a plurality of clamping apertures, wherein the first pole is configured to fit within the second pole, and a clamp having a body with a one or more pin extensions and one or more locking extensions, wherein the pin extensions and the locking extensions are arranged in an alternating manner, a pivot handle operably connected to the body, the pivot handle having a lever arm that extends from an offset hinge, the offset hinge defining a hinge axis, and a pivot pin passing through the one or more pin extensions of the body and the offset hinge of the pivot handle, the pivot pin defining a pivot axis, wherein the hinge axis and the pivot axis are parallel but offset from each other, and wherein the one or more locking extensions are arranged to be actuated by the offset hinge as the pivot handle is rotated about the pivot axis of the pivot pin. The pin extensions are configured to fit within respective ones of the clamping apertures to attach the clamp to the second pole, and the locking extensions are configured to selectively engage with an outer surface of the first pole to secure the first pole to the second pole by the clamp.

In addition to one or more of the features described above, or as an alternative, further embodiments of the telescoping pole systems may include a locking protrusion formed at an end of each locking extension.

In addition to one or more of the features described above, or as an alternative, further embodiments of the telescoping pole systems may include that the body has a rounded triangular geometry.

In addition to one or more of the features described above, or as an alternative, further embodiments of the telescoping pole systems may include at least one positioning protrusion formed on an interior surface of body.

In addition to one or more of the features described above, or as an alternative, further embodiments of the telescoping pole systems may include that the offset hinge defines a gradually increasing radius of material thickness in a rotation from an open state to a closed state.

In addition to one or more of the features described above, or as an alternative, further embodiments of the telescoping pole systems may include that the body has a first diameter opening at a first end and a second diameter opening at a second end, wherein the first diameter opening is smaller than the second diameter opening.

In addition to one or more of the features described above, or as an alternative, further embodiments of the telescoping pole systems may include that the first diameter opening is defined by one or more stop structures.

In addition to one or more of the features described above, or as an alternative, further embodiments of the telescoping pole systems may include that the body defines a through-aperture from the first diameter opening to the second diameter opening.

In addition to one or more of the features described above, or as an alternative, further embodiments of the telescoping pole systems may include a third pole and a second clamp, wherein the second pole is configured to fit within the third pole, and the second clamp is configured to secure the second pole relative to the third pole.

In addition to one or more of the features described above, or as an alternative, further embodiments of the telescoping pole systems may include a tool connector arranged on an end of the first pole away from a location where the clamp connects the first pole to the second pole.

In addition to one or more of the features described above, or as an alternative, further embodiments of the telescoping pole systems may include at least one of a grip arranged on an end of the second pole away from a location where the clamp connects the first pole to the second pole and a mid-grip arranged on the second pole at a location between the clamp and the grip.

In addition to one or more of the features described above, or as an alternative, further embodiments of the telescoping pole systems may include that each of the first pole and the second pole have a multi-lobe geometry.

According to some embodiments, telescoping pole systems are provided. The telescoping pole systems include a first pole having a multi-lobe geometry in cross-section, a second pole having a multi-lobe geometry in cross-section and a plurality of clamping apertures, wherein the multi-lobe geometry of the first pole and the multi-lobe geometry of the second pole are the same and wherein the first pole is configured to fit within the second pole, and a selectively engageable clamp configured to fixedly connected to the second pole and selectively engage with an outer surface of the first pole to secure the first pole to the second pole by the clamp.

In addition to one or more of the features described above, or as an alternative, further embodiments of the telescoping pole systems may include that the clamp includes a body with a one or more pin extensions and one or more locking extensions, wherein the pin extensions and the locking extensions are arranged in an alternating manner, a pivot handle operably connected to the body, the pivot handle having a lever arm that extends from an offset hinge, the offset hinge defining a hinge axis, and a pivot pin passing through the one or more pin extensions of the body and the offset hinge of the pivot handle, the pivot pin defining a pivot axis. The hinge axis and the pivot axis are parallel but offset from each other, and wherein the one or more locking extensions are arranged to be actuated by the offset hinge as the pivot handle is rotated about the pivot axis of the pivot pin, the pin extensions are configured to fit within respective ones of the clamping apertures to attach the clamp to the second pole, and the locking extensions are configured to selectively engage with an outer surface of the first pole to secure the first pole to the second pole by the clamp.

In addition to one or more of the features described above, or as an alternative, further embodiments of the telescoping pole systems may include a third pole and a second clamp, wherein the second pole is configured to fit within the third pole, and the second clamp is configured to secure the second pole relative to the third pole.

In addition to one or more of the features described above, or as an alternative, further embodiments of the telescoping pole systems may include a tool connector arranged on an end of the first pole away from a location where the clamp connects the first pole to the second pole.

In addition to one or more of the features described above, or as an alternative, further embodiments of the telescoping pole systems may include at least one of a grip arranged on an end of the second pole away from a location where the clamp connects the first pole to the second pole and a mid-grip arranged on the second pole at a location between the clamp and the grip.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION

Embodiments of the present disclosure provide for a telescopic pole that is used with cleaning implements, such as window squeegees and brushes, dusters, ceiling fan dusters, brooms, wash brushes, sponges, mops, and other high-access cleaning implements which allows a user to adjust the length of a pole upon which the cleaning implement is attached. Embodiments of the present disclosure provide for a telescopic pole for use with implements that has an adjustable length to accommodate a user's height and/or reach of a cleaning implement. Embodiments of the present disclosure provide for clamps that enable releasably securing nested poles relative to each other.

Figure 1A:
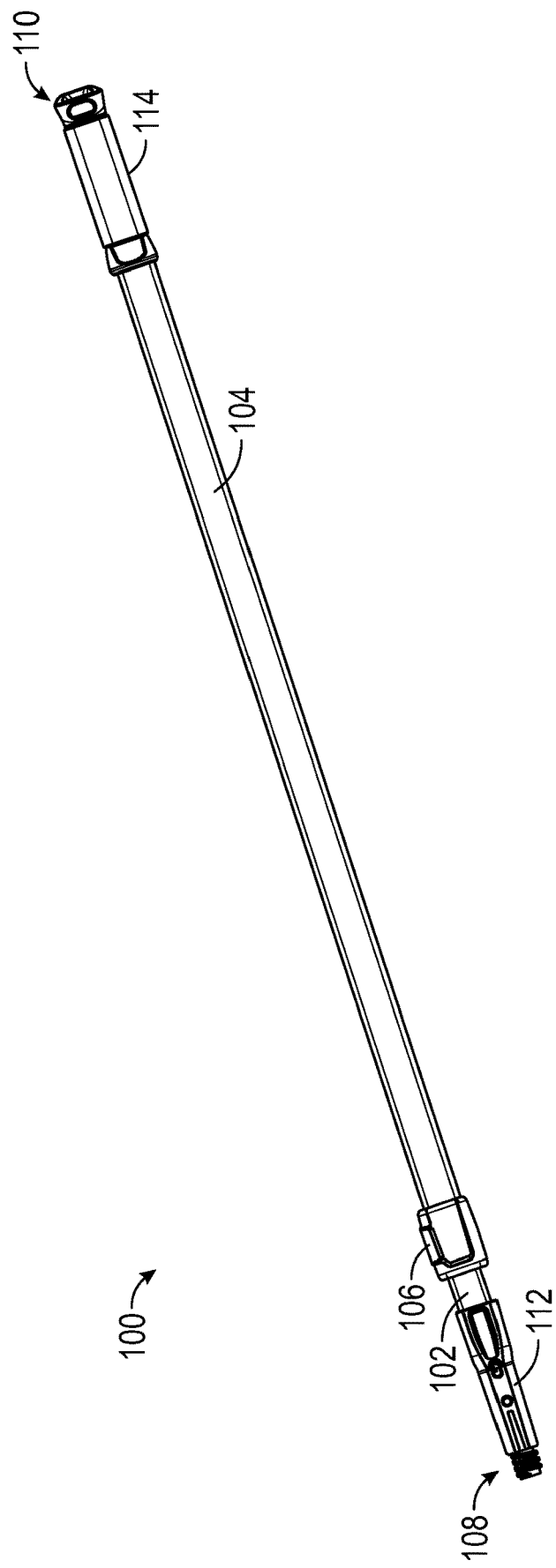
FIG. 1A is a schematic isometric view of a telescoping pole system in accordance with an embodiment of the present disclosure.
Figure 1B:
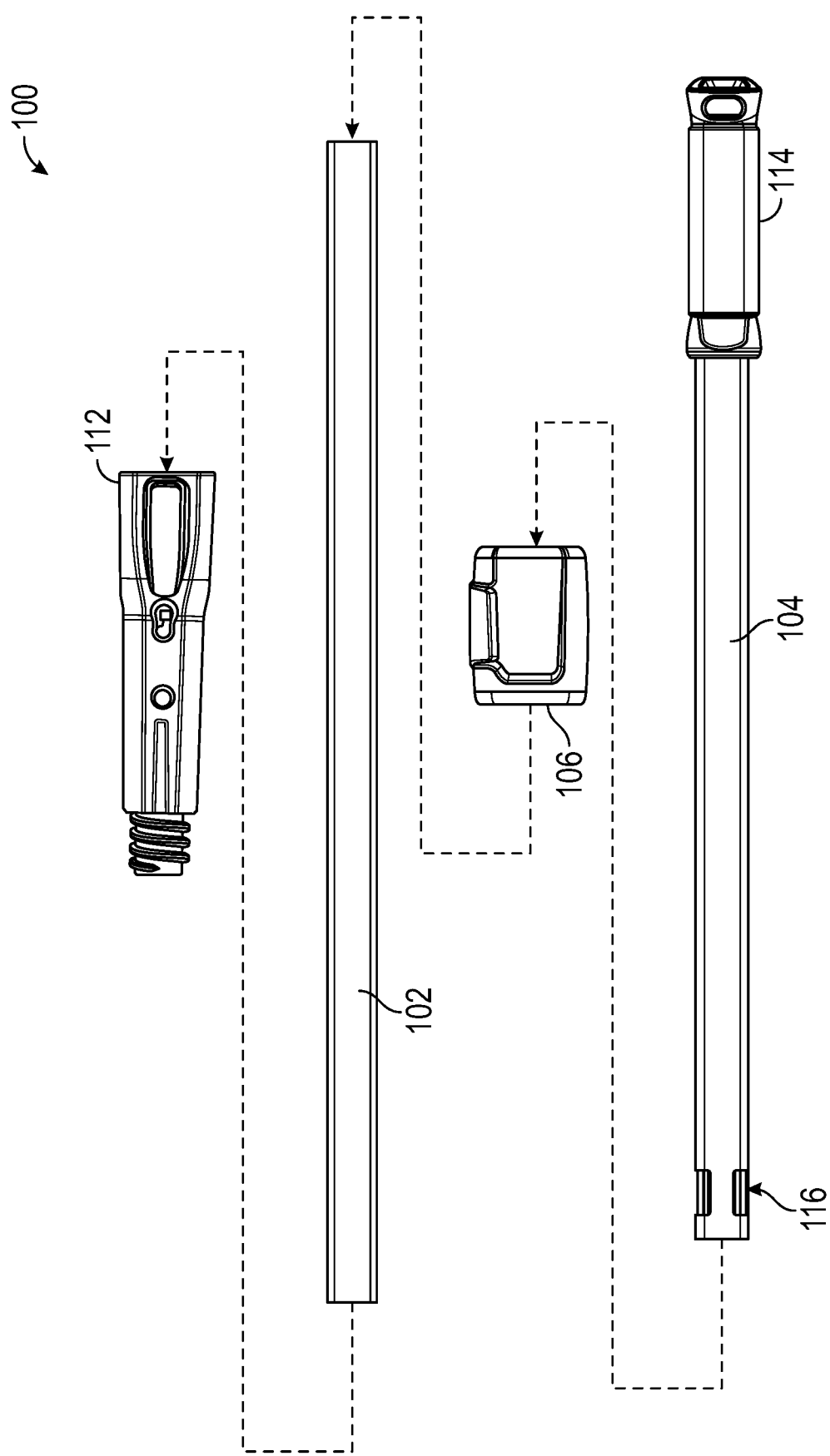
FIG. 1B is an exploded schematic of the telescoping pole system of FIG. 1A.

Referring to FIGS. 1A-1B, schematic illustrations of a telescoping pole system 100 in accordance with an embodiment of the present disclosure are shown. FIG. 1A illustrates an isometric assembled view of the telescoping pole system 100 and FIG. 1B illustrates the telescoping pole system 100 in an exploded view. The telescoping pole system 100 includes a first pole 102 and a second pole 104, with the first pole 102 nested within the second pole 104. That is, the first pole 102 is configured to fit within and be moveable within, along, and relative to the second pole 104. The first pole 102 may be selectively fixed relative to the second pole 104 by a clamp 106. When the clamp 106 is in an open position or open state, the first pole 102 may be slideably moveable relative to the second pole 104. When the clamp 106 is in a closed position or closed state, the first pole 102 is fixed relative to the second pole 104.

The telescoping pole system 100 extends from a first end 108 to a second end 110. As shown, the first pole 102 includes a tool connector 112 at the first end 108. The tool connector 112 may be configured to selectively or releasably engage with and attach a cleaning implement to the telescoping pole system 100, such as floor or window squeegees and brushes, dusters, brooms, brushes, sponges, mops, window cleaning devices, car/vehicle cleaning devices, building cleaning devices, ceiling cleaning device, and other high-access cleaning implements or any other type of cleaning device/implement that may require or employ an extendable or telescoping pole system. The second pole 104 includes a grip 114 at the second end 110. Although shown in FIG. 1 with the first pole 102 installed within the second pole 104, and thus having two nested poles, those of skill in the art will appreciate that additional nested poles may be provided without departing from the scope of the present disclosure.

As shown in FIG. 1B, the second pole 104 includes clamping apertures 116 at an end thereof. The clamping apertures 116 of the second pole 104 are configured to enable a portion of the clamp 106 to pass through the clamping apertures 116 and engage with an exterior surface of the first pole 102. The clamp 106 has a first end with a first diameter opening to receive the first pole 102 and a second end with a second diameter opening to receive the second pole 104, with the two openings being different sizes. The first diameter opening is sized such that the second pole 104 cannot pass therethrough.

Figure 2A:
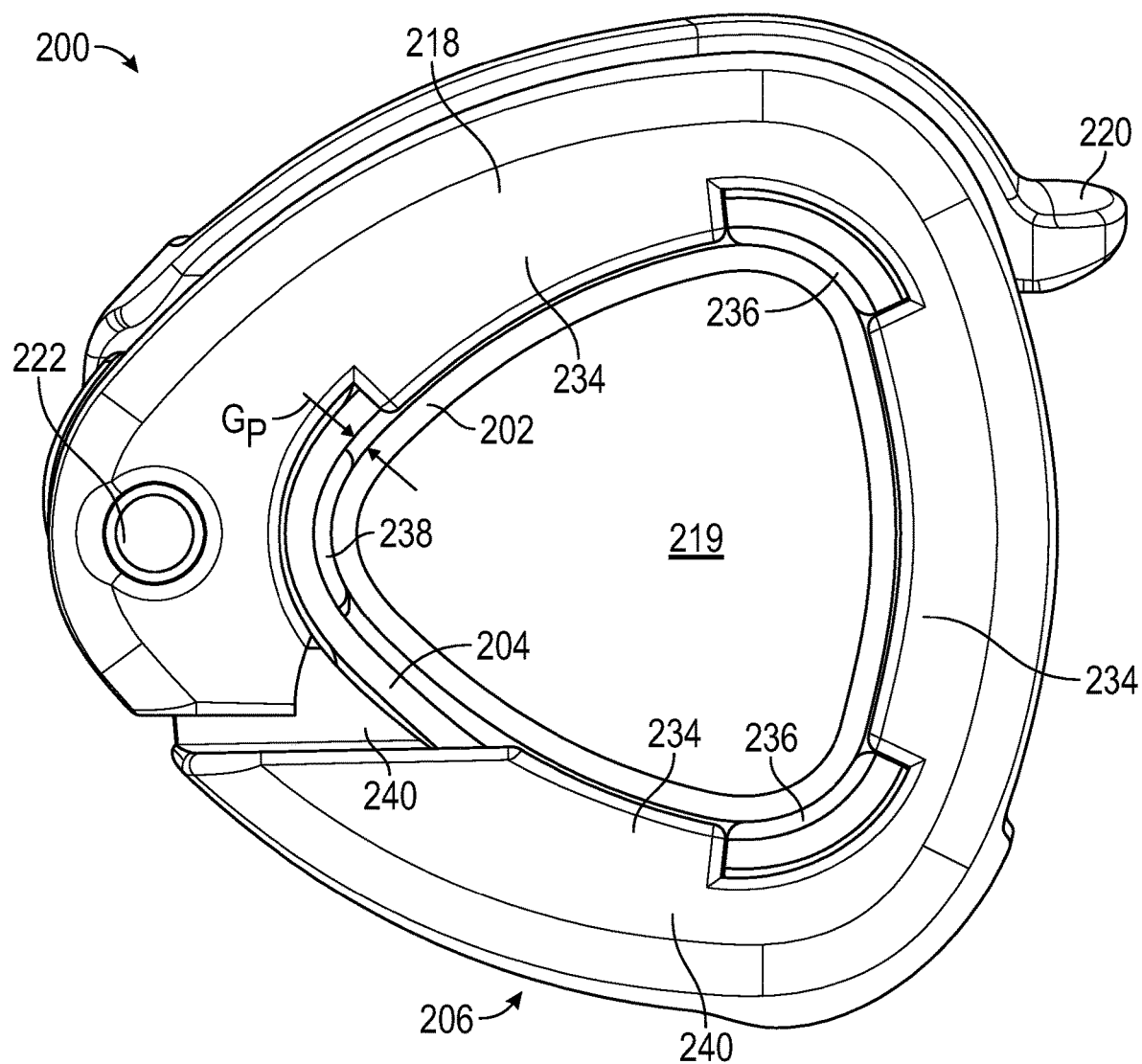
FIG. 2A is a schematic illustration of a telescoping pole system in accordance with an embodiment of the present disclosure.
Figure 2B:
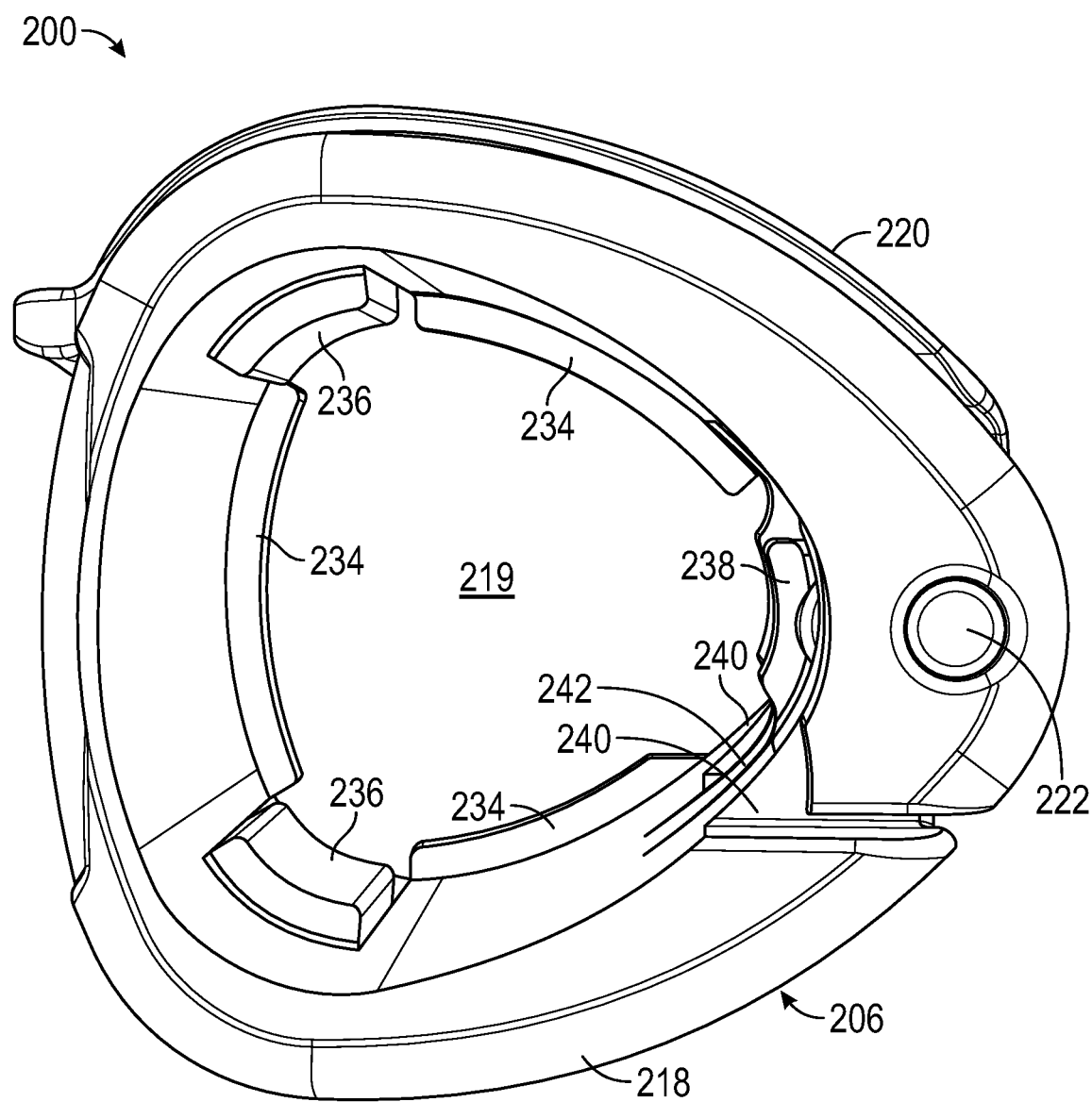
FIG. 2B is an isometric view of a clamp of the telescoping pole system of FIG. 2A.
Figure 2C:
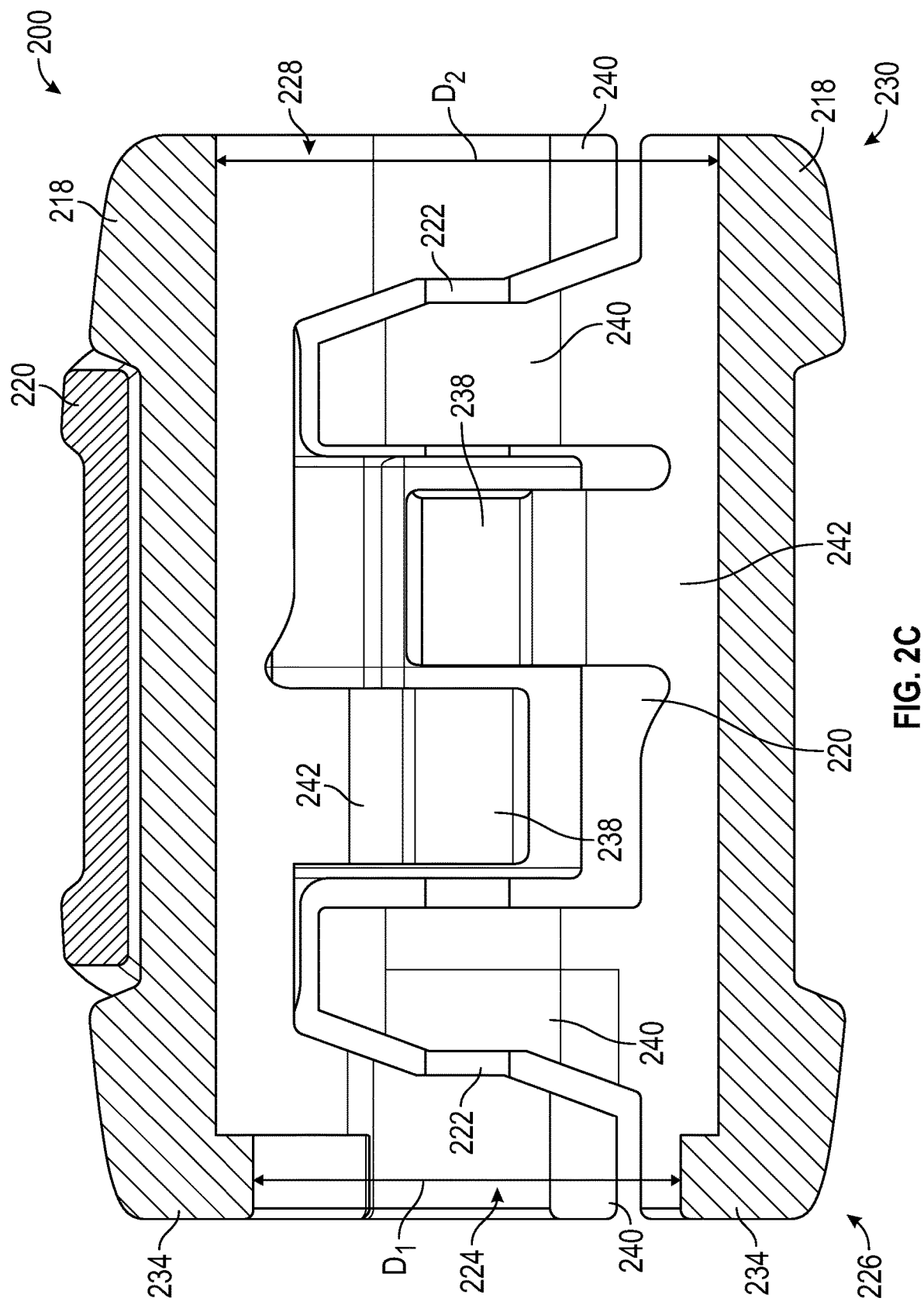
FIG. 2C is a cross-sectional illustration of the clamp of FIG. 2B.

Turning now to FIGS. 2A-2C, schematic illustrations of a telescoping pole system 200 in accordance with an embodiment of the present disclosure is shown. FIG. 2A illustrates a clamp 206 with two poles 202, 204 installed therethrough, in cross-section, FIG. 2B illustrates an isometric illustration of the clamp 206 showing the interior structure thereof, and FIG. 2C is a cross-sectional view of the clamp 206.

The telescoping pole system 200 includes a first pole 202 nested within a second pole 204. The first pole 202 is configured to fit within and be moveable within, along, and relative to the second pole 204, with a pole gap $G_p$ formed therebetween. The pole gap $G_p$ is a spacing between an external surface of the first pole 202 and an internal surface of the second pole 204. As shown, in this illustrative embodiment, the first pole 202 and the second pole 204 are have rounded triangular shapes or having a rounded triangular geometry or tri-lobe geometry or shape. In accordance with embodiments of the present disclosure, the poles may be multi-lobed, ranging from two lobes or more. Such multi-lobe geometry can enable a reduction in clamping pressure required because a rounded/lobed geometry prevents relative rotation which is typical of round or circular geometries. It will be appreciated that the geometry of the first and second poles (and any other/addition nested poles) will have the same geometric cross-sectional shape, with different diameters, radii, or other dimension selected to allow for one structure to fit within and move freely relative to another structure when not clamped together, as described herein. The term lobe as used herein means a curved or rounded portion or division between two sides. As such, embodiments of multi-lobe configurations includes two-sided, three-sided, four-sided, fived-sided, etc. geometric profiles.

The first pole 202 may be selectively fixed relative to the second pole 204 by the clamp 206. When the clamp 206 is in an open position or open state, the first pole 202 may be slideably moveable relative to the second pole 204. When the clamp 206 is in a closed position or closed state (as shown in FIG. 2A), a portion of the clamp 206 passes through the second pole 204 and engages with an exterior surface of the first pole 202. The second pole 204 includes clamping apertures, such as shown in FIG. 1B.

The clamp 206 includes a body 218 and a pivot handle 220 that is rotatably pivotable about a pivot pin 222. The body 218 has a first diameter opening 224 at a first end 226 and a second diameter opening 228 at a second end 230. The first diameter opening 224 has a first diameter $D_1$ that is less than or smaller than a second diameter $D_2$ of the second diameter opening 228. The through-aperture 219 is defined to include the first diameter opening 224 at the first end 226 and the second diameter operating 228 at the second end 230. The first diameter $D_1$ is selected such that the first pole 202 can pass therethrough but the second pole 204 cannot. The second diameter $D_2$ is selected to receive the second pole 204. The body 218 includes stop structures 234 are arranged at an end of the body 218 (e.g., as shown in FIG. 2C). The body 218 includes stop structures 234 that are configured to stop axial movement of the second pole 204 when the second pole 204 is installed within the clamp 206. The stop structures 234 define the first diameter $D_2$. That is, the stop structures 234 may extend inward toward a central axis of the clamp 206 a distance to stop a pole having a size and dimension of the second pole 204 from passing through the clamp 206.

The clamp 206 further includes positioning protrusions 236 and locking protrusions 238 arranged within the interior of the body 218. The protrusions 236, 238 are sized and shaped to fit within and pass through the clamping apertures of the second pole 204 and engage with an outer surface of the first pole 202 (e.g., at lobes of the first pole 202, as shown). The positioning protrusions 236 are fixed in position and configured to engage into clamping apertures of the second pole 204. When the positioning protrusions 236 engage with the clamping apertures of the second pole 204, the second pole 204 because locked with respect to the clamp 206. The positioning protrusions 236 may be configured to snap-fit into respective clamping apertures to secure the clamp 206 to the second pole 204. As such, the second pole 204 may become fixedly attached to the clamp 206.

In the open position or open state of the clamp 206, the locking protrusions 238 are functionally the same as the positioning protrusions 236 (i.e., fit within a clamping aperture). However, the locking protrusions 238 are configured to be actuated by the pivot handle 220 to further be moved into engagement with an outer surface of the first pole 202 and provide a clamping force thereto, thereby locking the first pole 202 relative to the second pole 204. When the clamp 206 is in the open state, the locking protrusions 238 do not engage with the first pole 202, and thus the first pole 202 is free to move axially through or relative to the clamp 206 and the second pole 204.

The body 218 of the clamp 206 is generally continuous and solid, but includes alternating extensions. As shown, pin extensions 240 and locking extensions 242 are arranged in an alternating manner. A set of pin extensions 240 are arranged to support and retain the pivot pin 222 within the body 218. The pin extensions 240 include holes or apertures for receiving the pivot pin 222. When the pivot pin 222 passes through the pin extensions 240, the body 218 forms a generally rigid structure that defines a through-aperture 219 to receive one or more poles, as described herein.

The locking extensions 242 are arranged to be moveable and include the locking protrusions 238 on ends thereof. The locking extensions 242 are arranged to engage with and be actuated by rotation of the pivot handle 220. In an embodiment, the locking extensions are a cantilevered arm extending from the body 218. As the pivot handle 220 is rotated from an open position to a closed position, the pivot handle 220 rotates about the pivot pin 222 and causes the locking extensions 242 and the locking protrusions 238 to be moved or pressed inward (e.g., radially inward) such that the locking protrusions 238 will engage with a surface of the first pole 202 and form a clamped or compressed engagement therewith. In an embodiment, when the pivot handle 220 is moved from the closed to the open position, the elasticity of the material of the locking extension 242 or the body 218 biases or causes the locking protrusions 238 to disengage from the first pole 202.

Figure 3A:
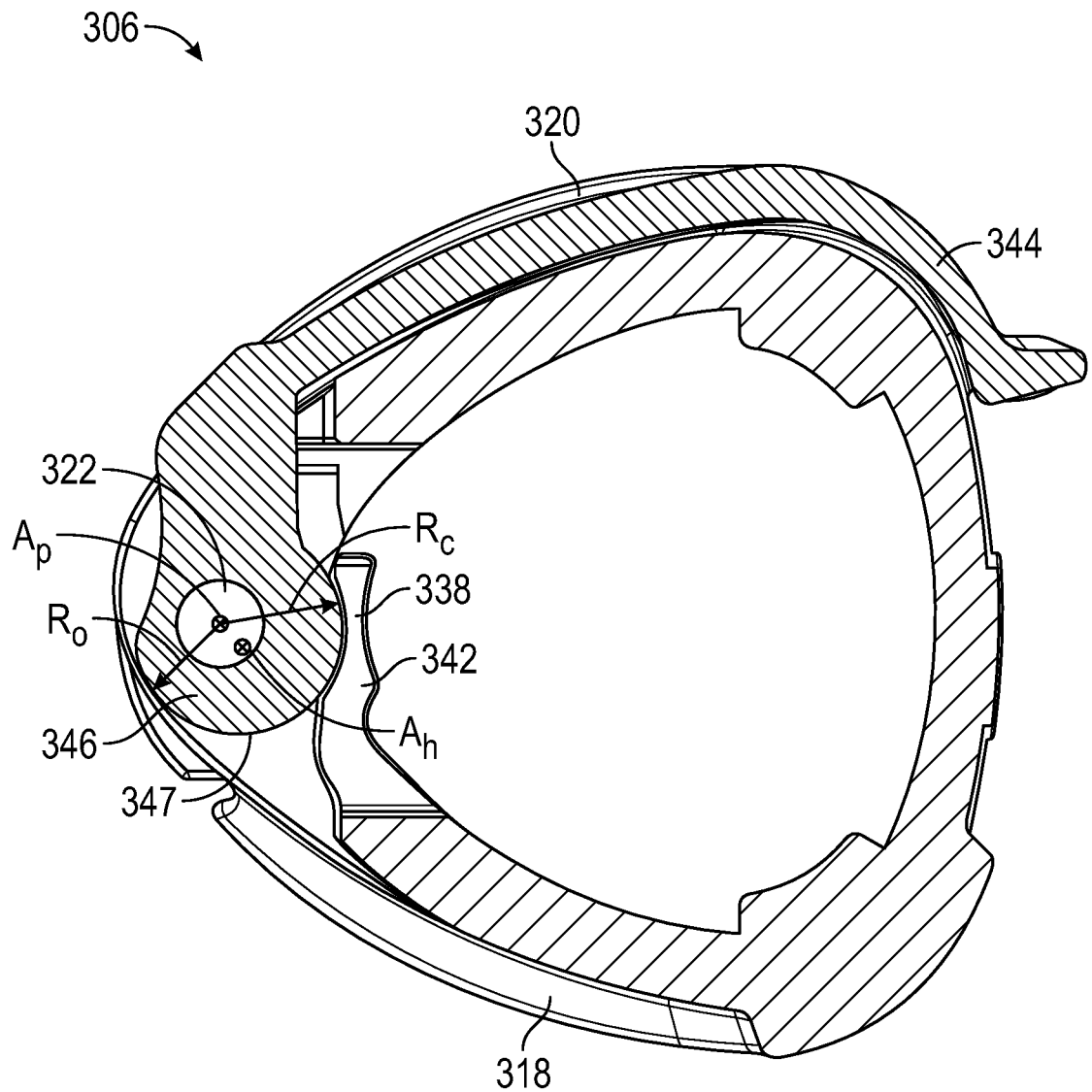
FIG. 3A is a schematic cross-sectional illustration of a clamp in accordance with an embodiment of the present disclosure, illustrating the clamp in a closed state.
Figure 3B:
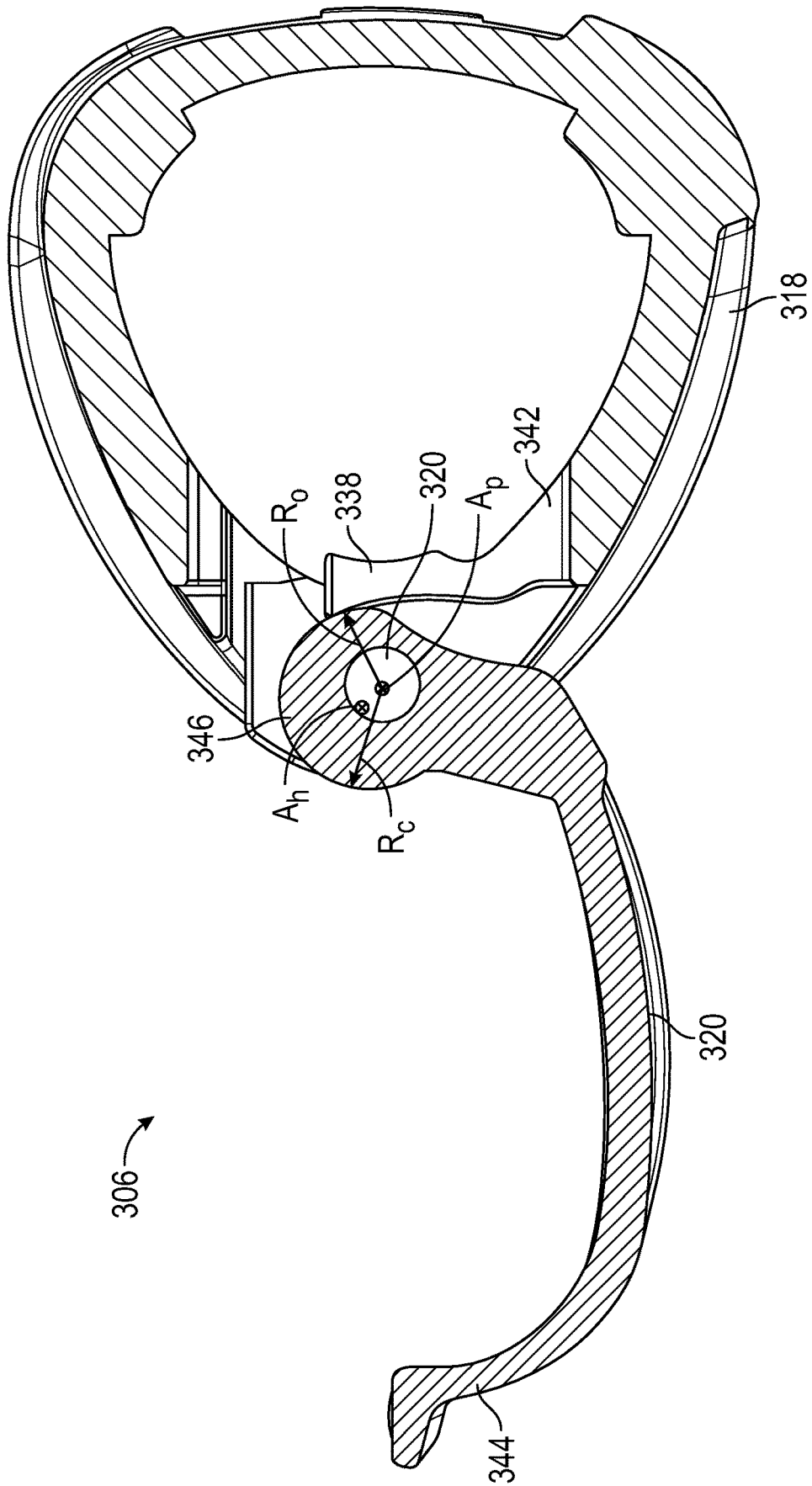
FIG. 3B is a schematic cross-sectional illustration of the clamp of FIG. 3A in an open state.

Turning now to FIGS. 3A-3B, schematic illustrations of a clamp 306 in accordance with an embodiment of the present disclosure are shown. The clamp 306 is configured to receive two poles and selectively connect or attach the two poles together, as shown and described above. FIG. 3A is illustrative of the clamp 306 in a closed position or closed state and FIG. 3B is illustrative of the clamp 306 in an open position or open state. In the closed state of FIG. 3A, the clamp 306 is configured to securely join a first pole to a second pole, and in the open state of FIG. 3B, the clamp 306 is configured to enable movement of the first pole relative to the second pole (e.g., to extend or shorten a length of a structure formed by the two poles).

The clamp 306 includes a body 318 and a pivot handle 320 that is rotatably pivotable about a pivot pin 322. The pivot handle 320 is configured to move or actuate one or more locking extensions 342 and associated locking protrusions 338. In an embodiment, the locking extensions are a cantilevered arm that extends from the body 318. To achieve such actuation, the pivot handle 320 includes a lever arm 344 that extends from an offset hinge 346. The pivot pin 322 passes through the offset hinge 346 such that the pivot handle 320 is rotatable about the pivot pin 322. The pivot pin 322 is set in fixed relation to the body 318 and passes through one or more pin extensions, as shown, for example, in FIG. 2C.

The pivot pin 322 defines a pivot axis $A_p$ therethrough and the pivot pin 322 passes through an offset location from a hinge axis $A_h$ that passes through the offset hinge 346. The offset of the pivot axis $A_p$ from the hinge axis $A_h$ results in a changing radius of the material to the surface 347 of the offset hinge 346. For example, as shown in FIG. 3A, in the closed state, the offset hinge 346 has a closed radius $R_c$ defined as a material thickness of the pivot handle 320 to the locking protrusions 338 from the pivot axis $A_p$ in the closed state. In the open state, shown in FIG. 3B, the offset hinge 346 has an open radius $R_o$ defined as a material thickness of the pivot handle 320 to the locking protrusions 338 from the pivot axis $A_p$ in the open state. It will be appreciated that the pivot axis $A_p$ and the hinge axis $A_h$ are parallel, but offset from each other.

The gradual change in material radius from the open radius $R_o$ (FIG. 3B) to the closed radius $R_c$ causes the locking extensions 342 and associated locking protrusions 338 to move radially inward. That is, the offset hinge 346 provides for a gradually increasing radius of material thickness when rotating from the open state to the closed state. In other words, the surface 347 forms a cam that acts on or engages the outer surface of the locking protrusion 338 or the locking extension 342 to cause the locking protrusion 338 to move towards or away from the pole. This radial movement of the locking extensions 342 and associated locking protrusions 338 ensures that the locking protrusions 338 will pass through a clamping aperture of a second (e.g., outer) pole to engage with an outer surface of a first (e.g., inner) pole. When the locking protrusions 338 engage with the first (inner) pole, the first pole will be clamped into engagement with the second pole, thus forming a substantially rigid structure having a desired length. When the pivot handle 320 is transitioned from the closed state (FIG. 3A) to the open state (FIG. 3B), the offset hinge 346 will rotate such that the locking protrusions 338 will move outwardly due to the gradually reduced material radius of the offset hinge 346 from the closed radius $R_c$ to the open radius $R_o$ due to the elasticity of the locking extension 342 material or the body 318.

Advantageously, the clamp systems described herein enable telescoping poles of varying configurations (e.g., lengths/sizes/number of components).

Figure 4:
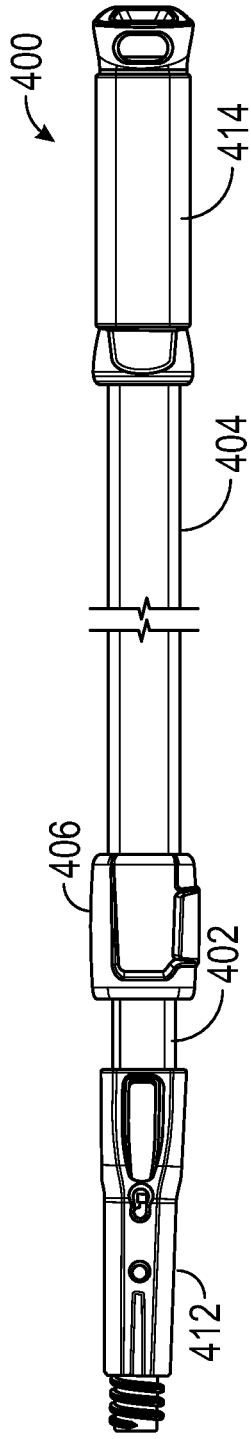
FIG. 4 is a schematic illustration of a telescoping pole system in accordance with an embodiment of the present disclosure.

For example, turning to FIG. 4, a schematic illustration of a telescoping pole system 400 in accordance with an embodiment of the present disclosure is shown. The telescoping pole system 400 includes a first pole 402 nested within a second pole 404. The first pole 402 is configured to fit within and be moveable within, along, and relative to the second pole 404. The first pole 402 may be selectively fixed relative to the second pole 404 by a clamp 406, similar to that shown and described above. When the clamp 406 is in an open position or open state, the first pole 402 may be slideably moveable relative to the second pole 404. When the clamp 406 is in a closed position or closed state, the first pole 402 is fixed relative to the second pole 404.

In this embodiment, the first pole 402 includes a tool connector 412 at an end opposite where the clamp 406 joins the first pole 402 to the second pole 404. The second pole 404 includes a grip 414 at an end opposite where the clamp 406 joins the first pole 402 to the second pole 404. In this configuration, the second pole 404 includes clamping apertures that enable a portion of the clamp 406 to pass through the second pole 404 and engage with the first pole 402. The clamp 406 may include positioning protrusions that are configured to snap-fit the second pole 404 into engagement with the clamp 406 at some of the clamping apertures. The clamp 406 further may include locking protrusions that are operable or actuable by a lever arm of the clamp 406 to snap into and pass through the clamping apertures to engage with an outer surface of the first pole 402.

Figure 5:
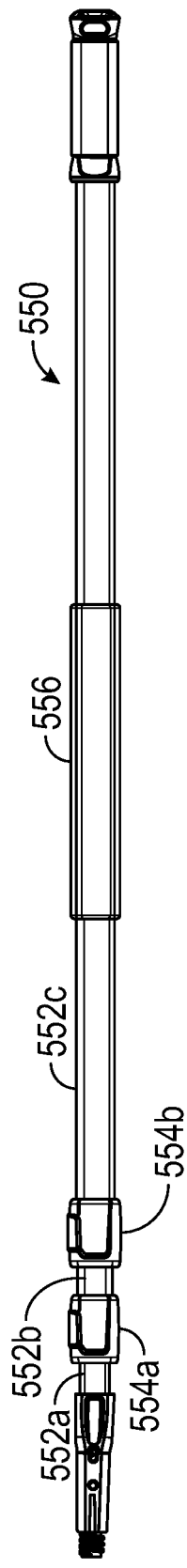
FIG. 5 is a schematic illustration of a telescoping pole system in accordance with an embodiment of the present disclosure.

Turning to FIG. 5, a schematic illustration of a telescoping pole system 550 in accordance with an embodiment of the present disclosure is shown. The telescoping pole system 550 includes a first pole 552a nested within a second pole 552b, and the second pole 552b nested within a third pole 552c. The first pole 552a is configured to fit within and be moveable within, along, and relative to the second pole 552b. Similarly, the second pole 552b is configured to fit within and be moveable within, along, and relative to the third pole 552c. Each of the first pole 552a and the second pole 552b may be selectively fixed relative to the second pole 552b and the third pole 552c, respectively, by clamps 554a, 554b, similar to that shown and described above. When the clamps 554a, 554b are in an open position or open state, the respective inner poles 552a, 552b may be slideably moveable relative to the respective outer poles 552b, 552c. When the clamps 554a, 554b are in a closed position or closed state, the respective inner poles 552a, 552b are fixed relative to the respective outer poles 552b, 552c.

In this configuration, the second pole 552b includes clamping apertures that enable a portion of a first clamp 554a to pass through the second pole 552b and engage with the first pole 552a, as described above. Similarly, the third pole 552c includes clamping apertures that enable a portion of a second clamp 554b to pass through the third pole 552c and engage with the second pole 552b, as described above. In this embodiment, the third pole 552c includes a mid-grip 556 that may aid a user in operating or using a cleaning implement attached to an end of the first pole 552a.

Figure 6:
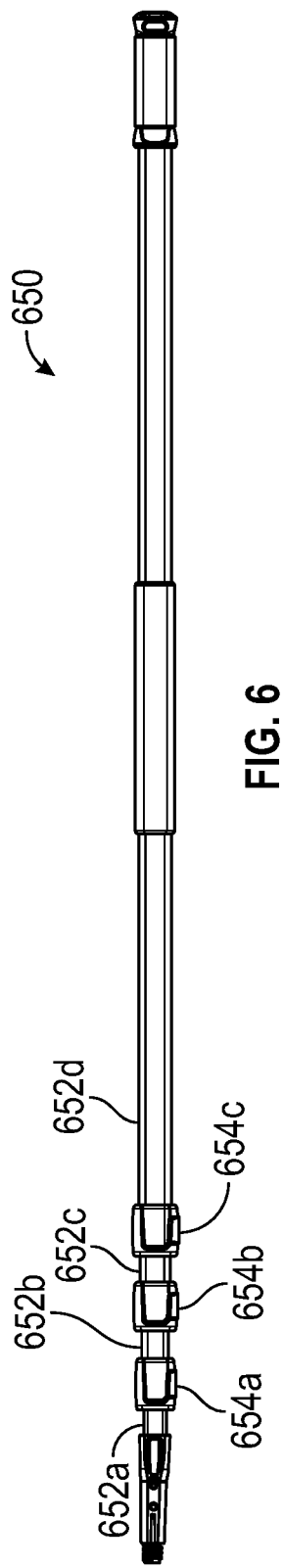
FIG. 6 is a schematic illustration of a telescoping pole system in accordance with an embodiment of the present disclosure.

Turning to FIG. 6, a schematic illustration of a telescoping pole system 650 in accordance with an embodiment of the present disclosure is shown. The telescoping pole system 650 includes a first pole 652a nested within a second pole 652b, the second pole 652b nested within a third pole 652c, and the third pole 652c nested within a fourth pole 652d. The first pole 652a is configured to fit within and be moveable within, along, and relative to the second pole 652b, the second pole 652b is configured to fit within and be moveable within, along, and relative to the third pole 652c, and the third pole 652c is configured to fit within and be moveable within, along, and relative to the fourth pole 652d. Each of the first pole 652a, the second pole 652b, and the third pole 652c may be selectively fixed relative to the second pole 652b, the third pole 652c, and the fourth pole 652d, respectively, by clamps 654a, 654b, 654c similar to that shown and described above. When the clamps 654a, 654b, 654c are in an open position or open state, the respective inner poles 652a, 652b, 652c may be slideably moveable relative to the respective outer poles 652b, 652c, 652d. When the clamps 654a, 654b, 654c are in a closed position or closed state, the respective inner poles 652a, 652b, 652c are fixed relative to the respective outer poles 652b, 652c, 652d.

In this configuration, the second pole 652b includes clamping apertures that enable a portion of a first clamp 654a to pass through the second pole 652b and engage with the first pole 652a, as described above. The third pole 652c includes clamping apertures that enable a portion of a second clamp 654b to pass through the third pole 652c and engage with the second pole 652b. The fourth pole 652d includes clamping apertures that enable a portion of a third clamp 654c to pass through the fourth pole 652d and engage with the third pole 652c.

In view of the above, it will be appreciated that any number of poles may be joined and slidably moveable relative to each other by use of clamps as shown and described herein. Further, the poles may be customized to specific applications, including grips, mid-grips, and tool connectors, which may be interchangeable or exchangeable to enable swapping or changing of a specific tool and system configuration.

As noted above, different multi-lobe configurations of both the poles and the associated clamps may be employed without departing from the scope of the present disclosure. For example, turning to FIGS. 7-9, various different multi-lobe geometry poles are shown.

Figure 7:
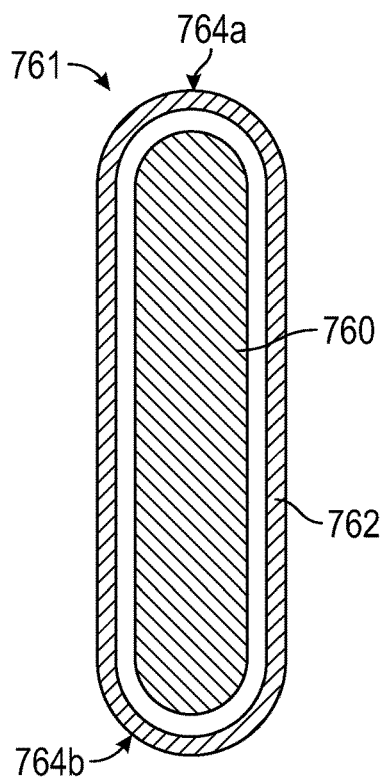
FIG. 7 is a schematic cross-sectional illustration of a two-lobe pole system in accordance with an embodiment of the present disclosure.

In FIG. 7, a two-lobe system 761 having a first pole 760 and a second pole 762 are shown. The first pole 760 is arranged within the second pole 762, and thus have similar lobe-geometries. The poles 760, 762 have a first lobe 764a and a second lobe 764b, thus defining a two-lobe geometry. In such systems, an associated clamp in accordance with embodiments of the present disclosure can engage at the first and second lobes 764a, 764b to securely connect the two poles 760, 762. Further, it is noted that such geometry prevents rotation of the two poles 760, 762 relative to each other, thus reducing the required clamping force necessary to secure the two poles 760, 762 (e.g., no force needed to prevent relative rotation).

Figure 8:
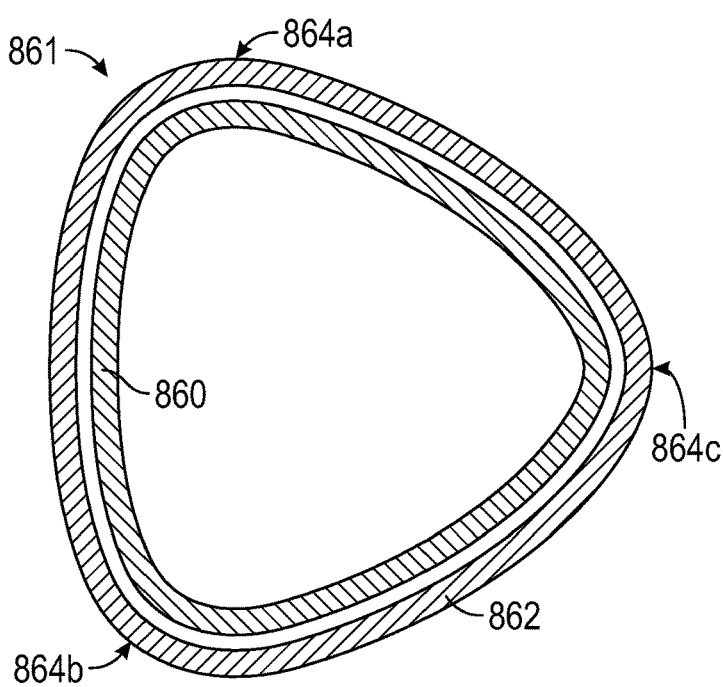
FIG. 8 is a schematic cross-sectional illustration of a three-lobe pole system in accordance with an embodiment of the present disclosure.

In FIG. 8, a three-lobe system 861 having a first pole 860 and a second pole 862 are shown. The first pole 860 is arranged within the second pole 862, and thus have similar lobe-geometries. The poles 860, 862 have a first lobe 864a, a second lobe 864b, and a third lobe 864c, thus defining a three-lobe geometry. In such systems, an associated clamp in accordance with embodiments of the present disclosure can engage at the first, second, and third lobes 864a, 864b, 864c to securely connect the two poles 860, 862. Further, it is noted that such geometry prevents rotation of the two poles 860, 862 relative to each other, thus reducing the required clamping force necessary to secure the two poles 860, 862 (e.g., no force needed to prevent relative rotation).

Figure 9:
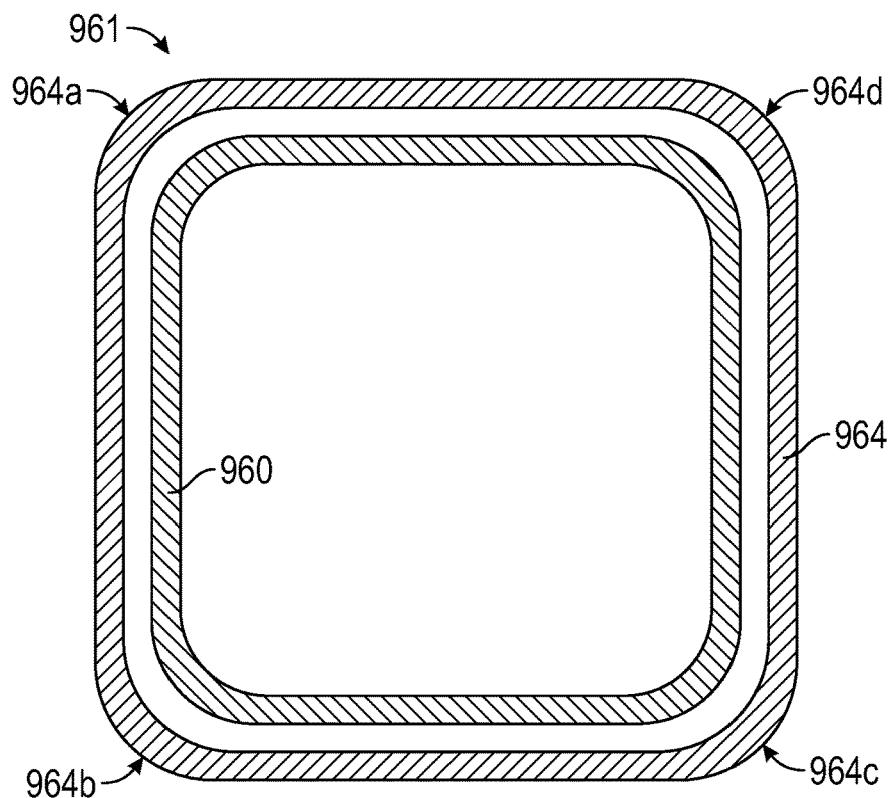
FIG. 9 is a schematic cross-sectional illustration of a four-lobe pole system in accordance with an embodiment of the present disclosure.

In FIG. 9, a four-lobe system 961 having a first pole 960 and a second pole 962 are shown. The first pole 960 is arranged within the second pole 962, and thus have similar lobe-geometries. The poles 960, 962 have a first lobe 964a, a second lobe 964b, a third lobe 964c, and a fourth lobe 964d thus defining a four-lobe geometry. In such systems, an associated clamp in accordance with embodiments of the present disclosure can engage at the lobes 964a, 964b, 964c, 964d of the pole 960, 962 to securely connect the two poles 960, 962. Further, it is noted that such geometry prevents rotation of the two poles 960, 962 relative to each other, thus reducing the required clamping force necessary to secure the two poles 960, 962 (e.g., no force needed to prevent relative rotation).

The multi-lobe geometry of the poles of the present disclosure ensures that the poles do not rotate relative to each other, when one pole is arranged within another pole. One advantage of this anti-rotation geometry of the poles enables the clamps of the present disclosure to apply less gripping force than convention clamps which must also provide for anti-rotation of the poles. Furthermore, such multi-lobed geometry provides for specific locations of engagement between the clamp and the poles. That is, clamps configured to engage with the poles as described herein will have similar multi-lobe geometries and provide for engagement to securely lock and affix one pole relative to another pole.

It will be appreciated that the clamps described herein can fixedly attach to an outer pole structure and have features that are movable to pass through the pole and engage within an inner pole. That is, the clamps of the present disclosure are configured to directly engage with both the outer poles and the inner poles. The described pivot handle having a lever arm and offset hinge allows for selective operation of the engagement of the clamp with multiple poles simultaneously.

It should be noted that the terms "first," "second," "third," "upper," "top," "bottom," "lower," "front," and "rear" and the like may be used herein to modify various elements. These modifiers do not imply a spatial, sequential, or hierarchical order to modify the elements unless specifically stated. The term "about" is intended to include the degree of error associated with measurement of the particular quantity based upon the equipment available at the time of filing the application.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A clamp for a multi-lobed telescoping pole, the clamp comprising:
    a split-ring body defining a split extending generally in a direction along a body axis through the body, the split defined by two or more extensions extending toward opposing sides relative to the split and arranged adjacent to each other in the direction along the body axis, wherein the two or more extensions comprise one or more pin extensions and one or more locking extensions,
    wherein the body has a multi-lobed geometry and the body defines a multi-lobe through-aperture extending in a direction along the body axis and configured to receive the multi-lobe telescoping pole, and
    wherein the one or more pin extensions and the one or more locking extensions each has a free end, wherein the free ends of the pin extensions and the locking extensions are arranged in an alternating manner along the split to form the split-ring body;
    a pivot handle operably connected to the body, the pivot handle having a lever arm that extends from an offset hinge comprising an eccentric cam surface, the offset hinge defining a hinge axis; and
    a pivot pin passing through the one or more pin extensions of the body and the offset hinge of the pivot handle, the pivot pin defining a pivot axis, wherein the pivot pin connects a pin extension extending from a first side of the split to join with a pin extension extending from a second side of the split to form a generally rigid structure,
    wherein the hinge axis and the pivot axis are parallel but offset from each other, and
    wherein the one or more locking extensions are arranged to be urged radially inward into the multi-lobe through-aperture by the eccentric cam surface of the offset hinge as the pivot handle is rotated about the pivot axis of the pivot pin.

2. The clamp of claim 1, further comprising a locking protrusion formed at the free end of each locking extension.

3. The clamp of claim 2, wherein each locking protrusion is configured to be urged radially inward by the rotation of the pivot handle.

4. The clamp of claim 1, further comprising at least one positioning protrusion formed on an interior surface of the body.

5. The clamp of claim 1, wherein the offset hinge defines a gradually increasing radius of material thickness in a rotation from an open state to a closed state.

6. The clamp of claim 1, wherein the body has a first diameter opening at a first end and a second diameter opening at a second end, wherein the first diameter opening is smaller than the second diameter opening.

7. The clamp of claim 6, wherein the first diameter opening is defined by one or more stop structures.

8. The clamp of claim 6, wherein the through-aperture extends from the first diameter opening to the second diameter opening.

9. A multi-lobed telescoping pole system comprising:
    a first multi-lobed pole;
    a second multi-lobed pole having a plurality of clamping apertures, wherein the first pole is configured to fit within the second pole; and
    a clamp comprising:
    a split-ring body defining a split extending generally in a direction along a body axis through the body, the split defined by two or more extensions extending toward opposing sides relative to the split and arranged adjacent to each other in the direction along the body axis, wherein the two or more extensions comprise one or more pin extensions and one or more locking extensions,
    wherein the body has a multi-lobed geometry and the body defines a multi-lobe through-aperture extending in a direction along the body axis and configured to receive the multi-lobe telescoping pole, and
    wherein the one or more pin extensions and the one or more locking extensions each has a free end, wherein the free ends of the pin extensions and the locking extensions are arranged in an alternating manner along the split to form the split-ring body,
    a pivot handle operably connected to the body, the pivot handle having a lever arm that extends from an offset hinge comprising an eccentric cam surface, the offset hinge defining a hinge axis, and
    a pivot pin passing through the one or more pin extensions of the body and the offset hinge of the pivot handle, the pivot pin defining a pivot axis, wherein the pivot pin connects a pin extension extending from a first side of the split to join with a pin extension extending from a second side of the split to form a generally rigid structure,
    wherein the hinge axis and the pivot axis are parallel but offset from each other, and
    wherein the one or more locking extensions are arranged to be urged radially inward into the multi-lobe through-aperture by the eccentric cam surface of the offset hinge as the pivot handle is rotated about the pivot axis of the pivot pin, wherein the locking extensions are configured to fit within respective ones of the clamping apertures to attach the clamp to the second pole, and wherein the locking extensions are configured to selectively engage with an outer surface of the first pole to secure the first pole to the second pole by the clamp.

10. The telescoping pole system of claim 9, further comprising a locking protrusion formed at an end of each locking extension.

11. The telescoping pole system of claim 9, wherein the body has a rounded triangular geometry.

12. The telescoping pole system of claim 9, further comprising at least one positioning protrusion formed on an interior surface of the body.

13. The telescoping pole system of claim 9, wherein the offset hinge defines a gradually increasing radius of material thickness in a rotation from an open state to a closed state.

14. The telescoping pole system of claim 9, wherein the body has a first diameter opening at a first end and a second diameter opening at a second end, wherein the first diameter opening is smaller than the second diameter opening.

15. The telescoping pole system of claim 14, wherein the first diameter opening is defined by one or more stop structures.

16. The telescoping pole system of claim 14, wherein the body defines a through-aperture from the first diameter opening to the second diameter opening.

17. The telescoping pole system of claim 9, further comprising a third pole and a second clamp, wherein the second pole is configured to fit within the third pole, and the second clamp is configured to secure the second pole relative to the third pole.

18. The telescoping pole system of claim 9, further comprising a tool connector arranged on an end of the first pole away from a location where the clamp connects the first pole to the second pole.

19. The telescoping pole system of claim 9, further comprising at least one of a grip arranged on an end of the second pole away from a location where the clamp connects the first pole to the second pole and a mid-grip arranged on the second pole at a location between the clamp and the grip.

20. The telescoping pole system of claim 9, wherein the multi-lobe geometry of the first pole and the second pole is selected from a two-lobe geometry, a three-lobe geometry, and a four-lobe geometry.

21. A telescoping pole system comprising:
a first pole having a multi-lobe geometry in cross-section;
a second pole having a multi-lobe geometry in cross-section and a plurality of clamping apertures, wherein the multi-lobe geometry of the first pole and the multi-lobe geometry of the second pole are the same and wherein the first pole is configured to fit within the second pole; and
a selectively engageable clamp configured to fixedly connected to the second pole and selectively engage with an outer surface of the first pole to secure the first pole to the second pole by the clamp, wherein the clamp comprises:
a split-ring body defining a split extending generally in a direction along a body axis through the body, the split defined by two or more extensions extending toward opposing sides relative to the split and arranged adjacent to each other in the direction along the body axis, wherein the two or more extensions comprise one or more pin extensions and one or more locking extensions,
wherein the body has a multi-lobed geometry and the body defines a multi-lobe through-aperture extending in a direction along the body axis and configured to receive the multi-lobe telescoping pole, and
wherein the one or more pin extensions and the one or more locking extensions each has a free end, wherein the free ends of the pin extensions and the locking extensions are arranged in an alternating manner along the split to form the split-ring body;
a pivot handle operably connected to the body, the pivot handle having a lever arm that extends from an offset hinge comprising an eccentric cam surface, the offset hinge defining a hinge axis; and
a pivot pin passing through the one or more pin extensions of the body and the offset hinge of the pivot handle, the pivot pin defining a pivot axis, wherein the pivot pin connects a pin extension extending from a first side of the split to join with a pin extension extending from a second side of the split to form a generally rigid structure,
wherein the hinge axis and the pivot axis are parallel but offset from each other, and
wherein the one or more locking extensions are arranged to be urged radially inward into the multi-lobe through-aperture by the eccentric cam surface of the offset hinge as the pivot handle is rotated about the pivot axis of the pivot pin.

22. The telescoping pole system of claim 21, further comprising a third pole and a second clamp, wherein the second pole is configured to fit within the third pole, and the second clamp is configured to secure the second pole relative to the third pole.

23. The telescoping pole system of claim 21, further comprising a tool connector arranged on an end of the first pole away from a location where the clamp connects the first pole to the second pole.

24. The telescoping pole system of claim 21, further comprising at least one of a grip arranged on an end of the second pole away from a location where the clamp connects the first pole to the second pole and a mid-grip arranged on the second pole at a location between the clamp and the grip.

* * * * *